United States Patent [19]

Crenwelge, Jr. et al.

[11] Patent Number: 4,725,991

[45] Date of Patent: Feb. 16, 1988

[54] METHOD FOR CONTROLLING BLASTING OPERATIONS

[75] Inventors: Otto E. Crenwelge, Jr., Katy; Timothy A. Peterson, Houston, both of Tex.

[73] Assignee: Shell Oil Company, Houston, Tex.

[21] Appl. No.: 868,918

[22] Filed: May 29, 1986

[51] Int. Cl.$^4$ ............................................. G01V 1/38
[52] U.S. Cl. ...................................... 367/23; 367/38; 367/49; 181/116
[58] Field of Search .................. 367/23, 49, 189, 190, 367/41, 37, 38, 73, 74, 48; 181/103, 106, 113, 116

[56] References Cited

U.S. PATENT DOCUMENTS 4,339,810  7/1982  Nichols et al. ..................... 367/49

OTHER PUBLICATIONS

"Spectral Analysis in Geophysics", by Markus Bath, Elsevier Scientific Publishing Co., 1974, pp. 316–317, 357–358, 373–376, 379–383, 392–393.

"Introduction to Nonlinear Analysis", by W. J. Cunningham, McGraw-Hill Book Co., Inc., 1958, pp. 191–199.

"Mechanical Measurements", by T. G. Beckwith and N. Lewis Back, Addison-Wesley Publishing Co., 1979, pp. 40–50.

Anderson et al., "Synthetic Delay Versus Frequency Plots for Predicting Ground Vibration from Blasting", Pro. 3rd Inter. Symp. on Computer-Aided Seismic Analysis and Discrimination, IEEE, 1983.

Winzer et al., "A Study of the Mechanisms of Fragmentation and Vibration in Blasting Operations", Martin Marietta Laboratories Final Report, U.S. Dept. of Energy Contr. No. DE-AC01-80ET 14357, 1983.

Anderson et al., "A Method for Site-Specific Prediction and Control of Ground Vibration from Blasting", Proc. 11th Conf. Explosives and Blasting Technique, Soc. Explosives Engineers, 1985.

Office of Surface Mining, "Surface Coal Mining and Reclamation Operations; Permanent Regulator Program; Use of Explosives; General Performance Standards; Permit Application", Office of Surface Mining (OSM), Fed. Register, Mar. 8, 1983.

Siskind et al., "Structure Response and Damage Produced by Ground Vibration from Surface Mine Blasting", U.S. Dept. Interior Bur. of Mines Report of Investigations, 8507, 1980.

Anderson et al., "Blast Design for Optimizing Fragmentation While Controlling Frequency of Ground Vibration", Proc. 8th Conf. Explosives and Blasting Technique, Soc. Explosives Engineers, 1982.

Primary Examiner—Charles T. Jordan
Assistant Examiner—John W. Eldred

[57] ABSTRACT

A method for predicting the ground vibration and airborne noise at any position resulting from a blasting operation using the data obtained from one or more single-charge low level blasts. By using convolution in the frequency domain, large charge weight nonlinear vibrations are considered, such that the optimum excitation frequency (detonation delays) is induced for minimizing objectionable ground and air vibrations and noise. The method also allows optimization of the number, position and loading of the blast holes, and the number and position of charges detonated per delay period, to produce maximum removal of material without damage to surrounding structures.

25 Claims, 3 Drawing Figures

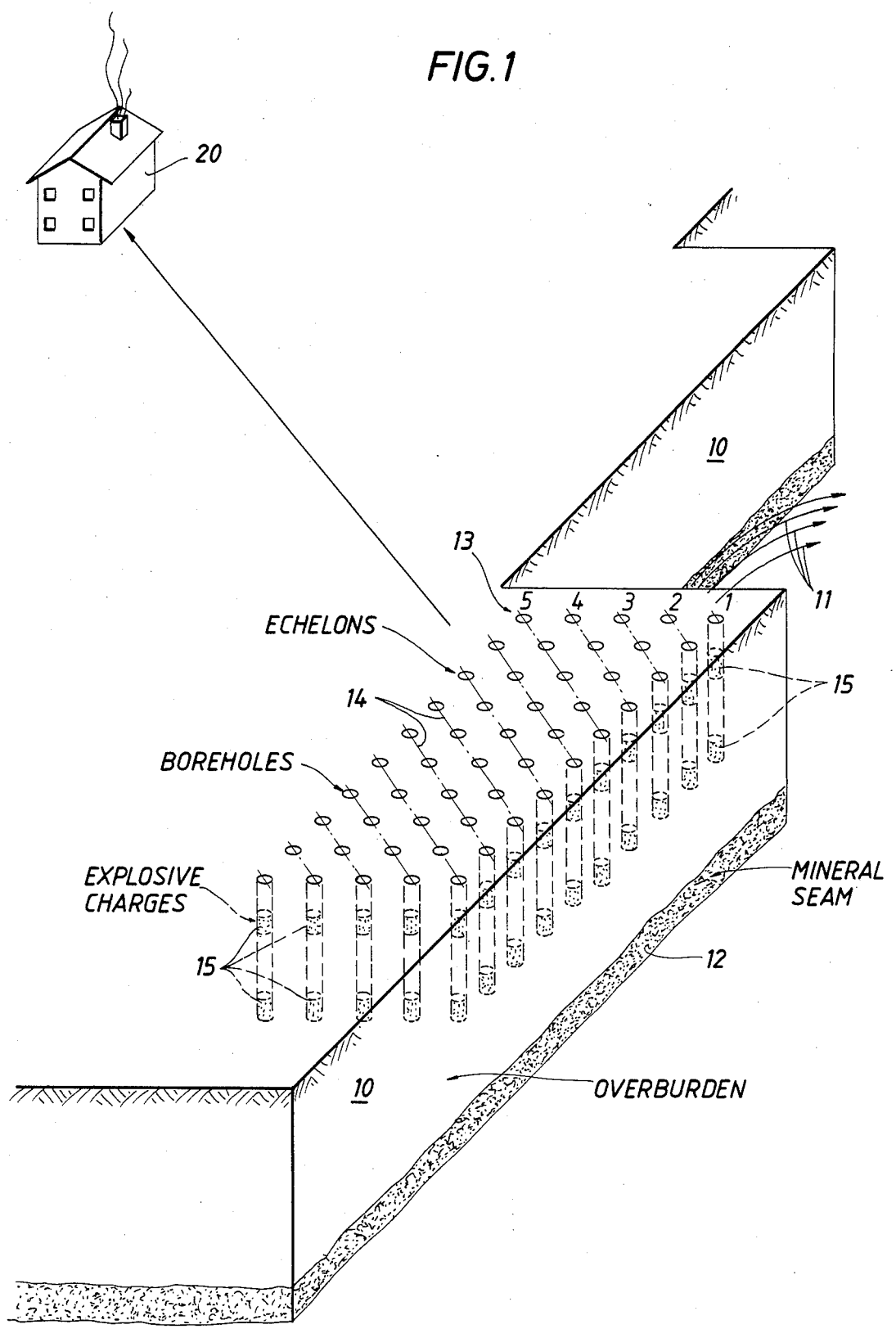

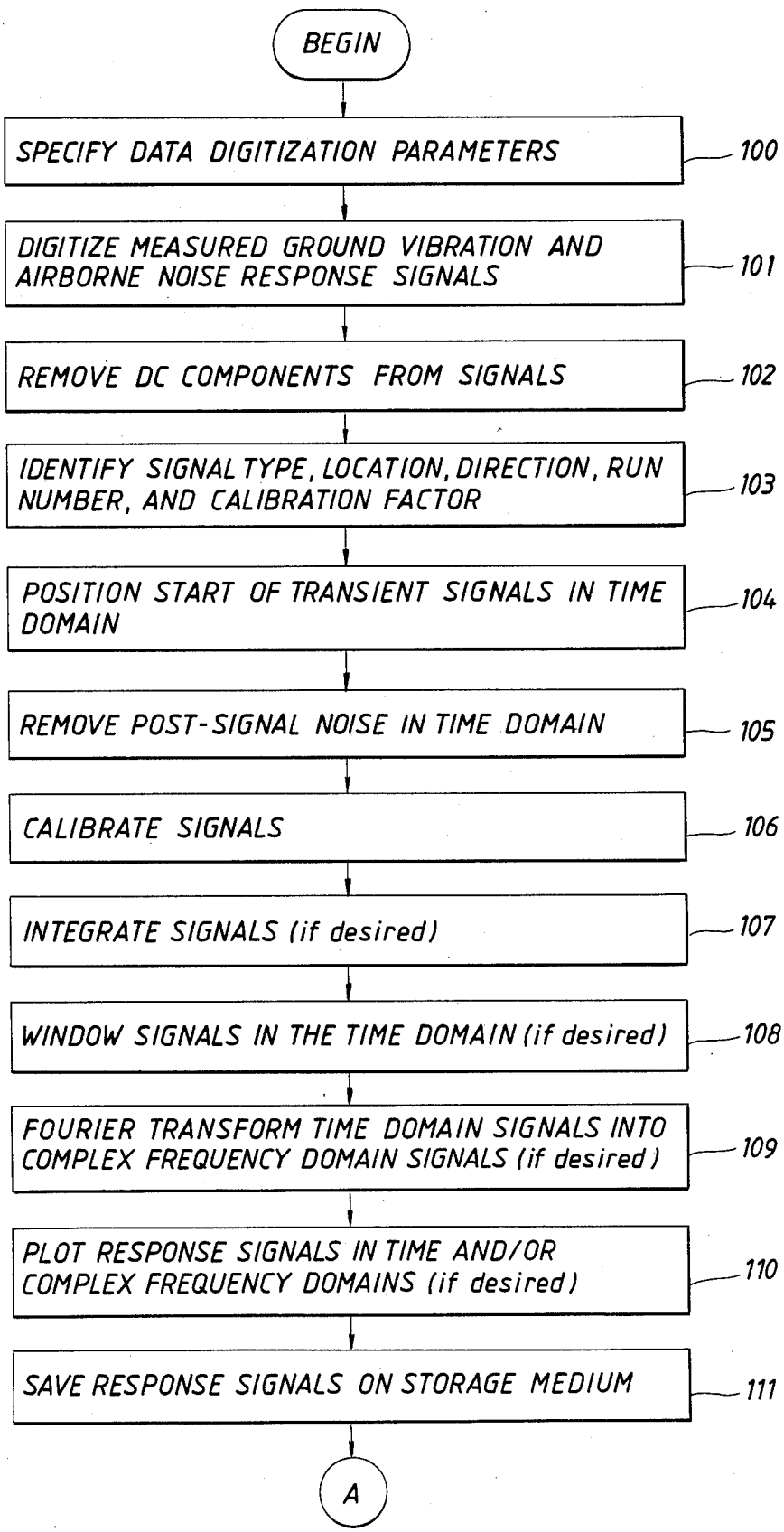
FIG.2 BLAST VIBRATION ANALYSIS, PREDICTION, AND MINIMIZATION
PHASE I: PRE-PROCESSING OF MEASURED RESPONSE SIGNALS PHASE II: NORMALIZATION OF ONE MEASURED RESPONSE SIGNAL BY ANOTHER:
   a: EXTRACTION OF TRUE EXCITATION SIGNAL FOR COMPARISON WITH SYNTHESIZED EXCITATION SIGNAL
   b: SCALING OF CHARGE WEIGHT, DISTANCE, DIRECTION, ETC.

FIG. 2
PHASE II: (CONTINUED)
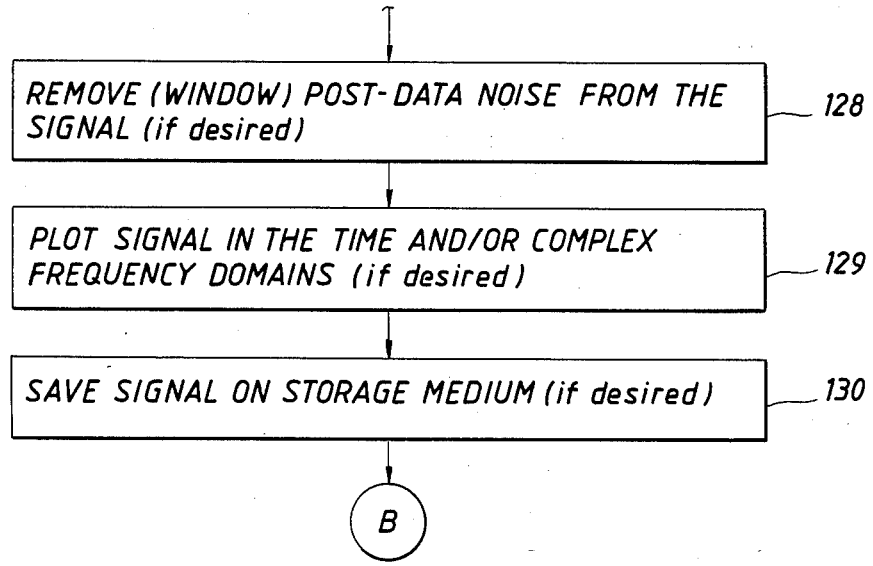
PHASE III: SYNTHESIS OF EXCITATION SIGNALS AND PREDICTION OF RESPONSE SIGNALS FOR MINIMIZING VIBRATION AND NOISE
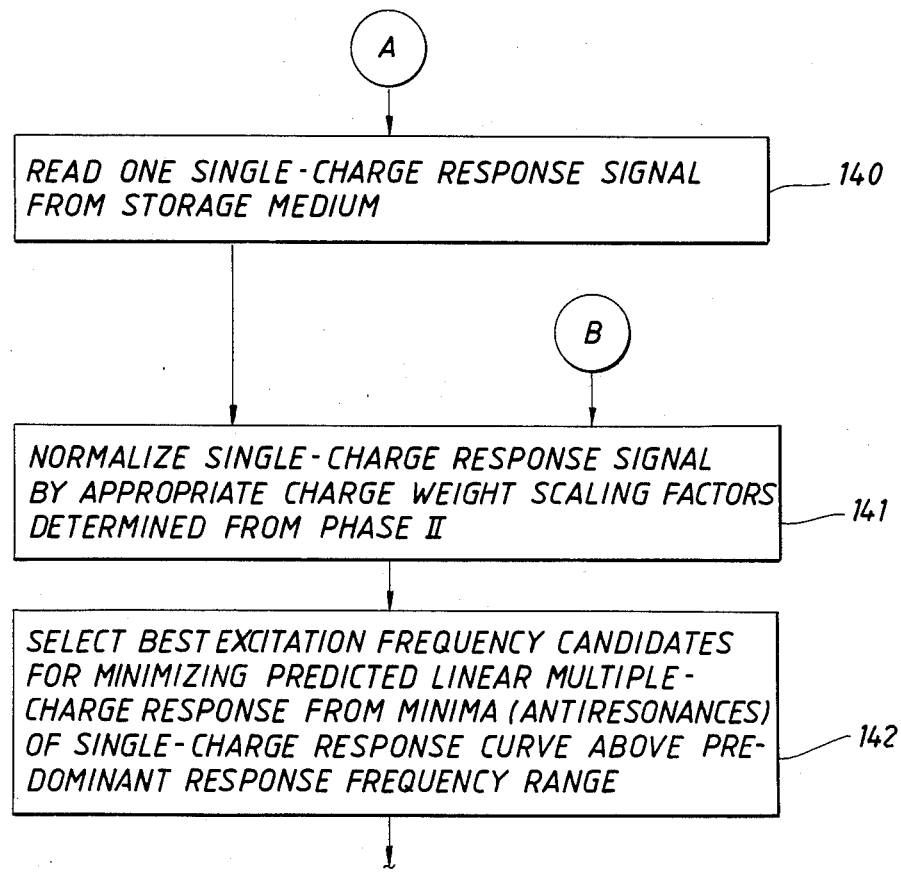

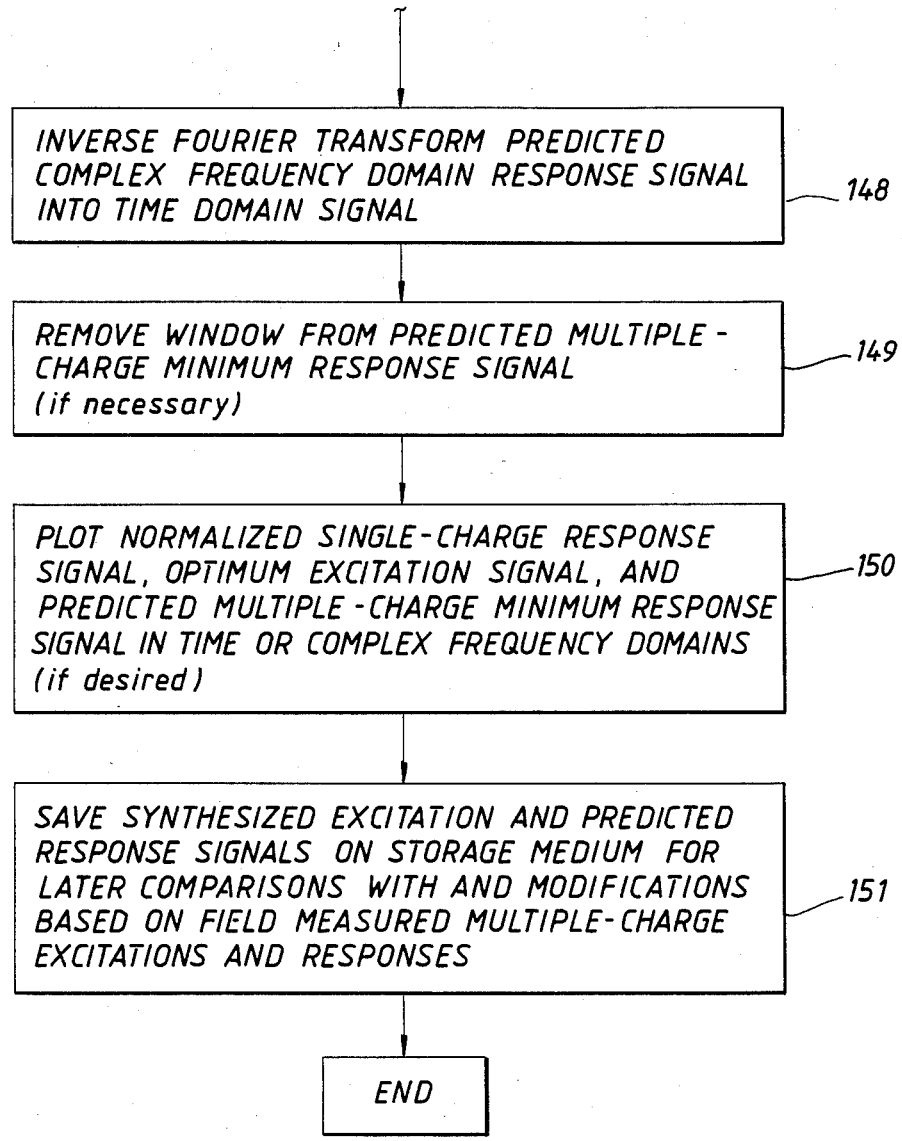

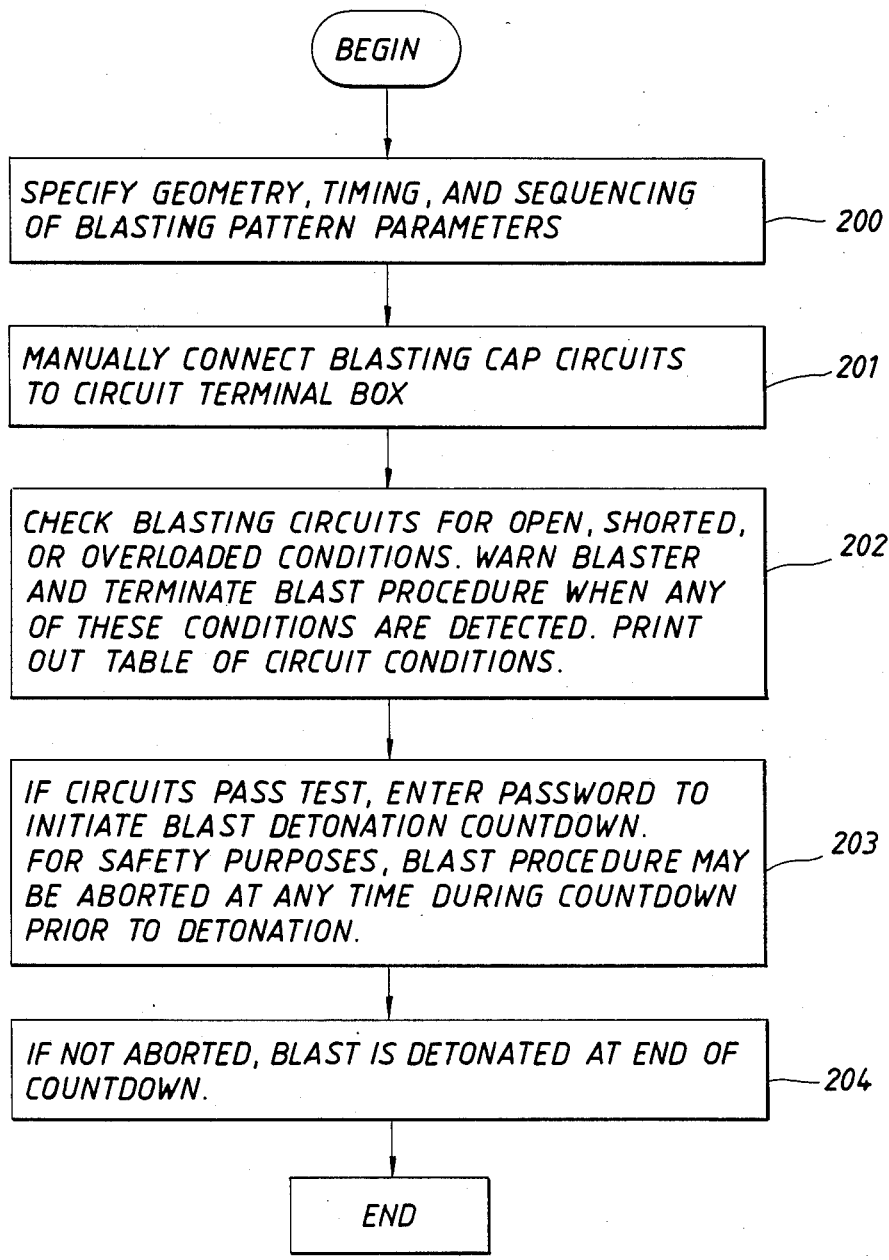

METHOD FOR CONTROLLING BLASTING OPERATIONS

BACKGROUND OF THE INVENTION

The present invention relates to blasting operations and particularly to blasting operations conducted in conjunction with mineral mining, for example, coal mining in either surface or underground mines. In surface mining operations it is usually necessary to remove overburden to uncover the mineral deposits, for example, the coal seam. When the overburden is composed of loose soil or unconsolidated rock-like materials it can easily be removed by conventional earth moving equipment. In contrast, when the overburden consists of highly consolidated soils or rock, for example limestone or sandstone, blasting operations must ordinarily be employed to fragment the material before it can be removed. Sometimes such blasting operations can also be caused to throw or cast the overburden material into the previously excavated pit. This obviously saves the time and expense of equipment removal of the fragmented overburden from the coal seam.

Blasting operations in surface coal mines can induce high level ground vibrations and airborne noise. When surface mining operations are located near critical structures, e.g., homes, buildings, towers, pipelines, etc., structural damage from blast induced vibrations and noise is a possibility. In addition, the subjective evaluation of noise and vibration by the community as being either structurally damaging or an environmental nuisance can lead to complaints, bad relations, and litigation. Because of this, blasters must either follow strict (and quite conservative) laws limiting charge weight, or they must monitor each shot to prove their compliance with vibration regulations. These constraints affect the manner in which the blast is conducted and require extra time, equipment, personnel, and explosives, all of which impact the industry economically.

Blasting operations input large amounts of impulsive energy into the surrounding earth medium. A portion of this energy is transmitted away from the blast region in the form of vibrational waves. If the excitation frequencies of a multiple-charge blast coincide with preferential ground response frequencies, then even small excitation amplitudes can excite amplified ground motions. If ground response frequencies coincide with resonance frequenices of nearby structures, as is frequently the case in coal overburden blasting operations, amplified structural motions and possibly structural damage can occur. For houses, whole structure resonances occur roughly between 4–10 Hz, and wall resonances occur roughly between 10–25 Hz. Exact frequencies depend upon structure geometry and material properties.

Notwithstanding the considerable work and studies already done in this field, there still remains a substantial need for improved methods and apparatus which can better control the amplitude, frequency, and duration of blast induced vibrations and noise. Further, this must be of a sort which can be easily transferred to operating companies so that field personnel may use it both for preventing structural damage, and for meeting community concerns as well. In addition, a need remains for improving the effectiveness of the overburden removal process, such as by increasing the fragmentation, swell, and cast of the overburden material thrown from the coal seam.

It appears that most studies reported in the blasting literature, while providing some understanding of the basic excitation and vibration phenomena, are of limited value for making accurate amplitude or frequency predictions. In addition, the measurement and analysis methods seem limited in light of the signal processing techniques which are in common use in other fields of engineering and geophysics.

Two notable exceptions were the studies of Siskind, et al, (Siskind, D. E., Stagg, M. S., Kopp, J. W., and Dowding, C. H., 1980, "Structure Response and Damage Produced by Ground Vibration from Surface Mine Blasting," Bur. of Mines Report of Investigations, 8507) and Anderson, et al, 1982, (Anderson, D. A., Winzer, S. R., and Ritter, A. P., 1982, "Blast Design for Optimizing Fragmentation while Controlling Frequency of Ground Vibration," Proc. 8th Conf. Explosives and Blasting Technique, Soc. Explosives Engrs.). The evolution of understanding in this field is well covered in the bibliographies of these two publications, as well as that of Anderson, et al, 1985, (Anderson, D. A., Ritter, A. P., Winzer, S. R., and Reil, J. W., 1985, "A Method for Site-Specific Prediction and Control of Ground Vibration from Blasting," Proc. 11th Conf. Explosives and Blasting Technique, Soc. Explosives Engrs.).

The Bureau of Mines (BOM) conducted an exhaustive empirical study which attempted to account for the frequency, charge weight, and distance effects of blast vibrations on structural response and damage (Siskind, et al,). However, this study represents many different overburden and construction material types, and the data is spread over 1–2 orders of magnitude. Hence, these results cannot be used to accurately predict the maximum vibrational velocity of the overburden material, referred to as the peak particle velocity (PPV) amplitude, for a particular mine site since the effects of excitation, ground, and structural frequencies on the data presented are not known. The best that can be done is to use the BOM data to make extremely conservative estimates of PPV amplitude which will guarantee that regulatory limits are not exceeded.

Hence, the Office of Surface Mining (OSM) (Office of Surface Mining, 1983 "Surface Coal Mining and Reclamation Operations; Permanent Regulatory Program; Use of Explosives; General Performance Standards; Permit Application," Fed. Reg., Mar. 8, 1983 adopted blasting vibration regulations based upon the BOM study which allow three methods for a blasting operation to demonstrate compliance, i.e., the maximum overall PPV method, the scaled-distance method, and the PPV-frequency chart method. If a company can show by measurement and analysis that they possess an accurate PPV prediction method which allows them to use larger charge weights than allowed by OSM regulations, then they may blast using the higher charge weights per delay. A primary objective of the present invention is to provide this improvement.

Only recently have investigators in this field realized that proper firing delay control might be used to control vibration frequencies, minimize vibration amplitudes and durations, assist in reinforcement or cancellation of stress waves, and optimize material fragmentation (Anderson, et al, 1982). Although the necessary electrical equipment for controlling the frequency (delay periods) of blast excitation impulses exists, little use has been made of this approach to date.

Recently, Anderson, et al, (1985) reported a technique for predicting site specific ground vibrations excited by blasting operations. See also Anderson, et al, 1983 (Anderson, D. A., Winzer, S. R., and Ritter, A. P., 1983, "Synthetic Delay Versus Frequency Plots for Predicting Ground Vibration From Blasting," (Proc. 3rd Inter. Symp. on Computer-aided Seismic Analysis and Discrimination, IEEE). This technique involves measuring a ground response time history to a single-charge blast and then repeatedly superposing (adding) this time-domain signal, delayed in time, to construct a synthetic multiple-charge response time history. This procedure is repeated for a large range of delay period intervals. Ranges of amplitude levels of the predicted multiple-charge signals are then mapped on a delay versus frequency plot. The best delay period, consistent with currently accepted blasting practice, is then selected for suitably reducing vibrations at critical ground frequencies. This superposition approach implies that the ground response is linear, i.e., has relatively small deflections, an assumption which it is believed does not hold in general, especially for large charge weights per delay such as those used in explosive fragmentation and casting operations in surface coal mines.

The nonlinear effect was briefly mentioned by Anderson, et al, (1985) and deferred to a later presentation. However, Winzer, et al (Winzer, S. R., Anderson, D. A., Ritter, A. P., Holloway, D. C., and Thomas, H. E., 1983, "A Study of the Mechanisms of Fragmentation and Vibration in Blasting Operations," Martin Marietta Laboratories Final Report, U.S. Dept. of Energy Contr. No. DE-ACO1-80ET 14357) noticed a strong nonlinear effect in quarry blasts for some charge weight, delay period, and hole spacing combinations. This paper further states (p. 23) that this rendered the linear superposition approach unacceptable. Obviously, therefore, there are potentially important inconsistencies in the prior art.

SUMMARY OF THE INVENTION

The present invention is the result of work on a site specific technique which also utilizes measurements of ground response to single-charge blasts (wavelets). In the present invention, however, the complex frequency domain characteristics of the wavelet are used, along with the linear and nonlinear components of a synthesized multiple-charge excitation signal, to select the optimum excitation delay period for minimizing ground vibration. A frequency domain convolution is then performed to predict this minimum vibration. Hence, the present invention accounts for nonlinear vibration responses which occur in overburden blasting operations due to the commonly used large charge weights per delay.

Tests have indicated that by utilizing this frequency control approach to minimize the energy radiated and lost from the blast zone, more effective use of the explosive energy is obtained within the zone itself, providing improvements in fragmentation, swell, and casting of the overburden material. Since this technique allows the use of much larger charge weights per delay period than previously thought possible with scaled-distance predictions, a number of currently accepted blasting practices (rules of thumb) can now be reassessed. These include recommended powder factors, spacing to burden ratios, number of charges per delay, delay times per distance between boreholes, and so forth.

The advantage of measuring the single-charge wavelet (inherent in both Anderson's time superposition and the present frequency convolution improvement) is that the ground at a measurement point of interest can be accurately calibrated for an impulse applied at a specific location within the mine site, i.e., the specifics of overburden material and geometry need not be known since all variables are included in the accurately measured wavelet.

As a preferred embodiment of the invention, to facilitate the transfer and utilization of this new technology to and by operating companies, the software is appropriately programmed on a personal computer, whereby implementation in the field is readily facilitated, and blasting operations personnel can easily be trained in the use of the equipment, software, and measurement, analysis, prediction, minimization, and control procedures.

The present invention thus provides a method by which the surface vibrations and airborne noise induced by a blasting operation can be accurately analyzed, predicted, minimized, and controlled. In particular, the method begins by measuring the vibrational energy produced by the detonation of a single explosive charge. The resulting vibrational waves (or wavelets) are measured, preferably, at a plurality of predetermined locations. From the measured response the invention then predicts the vibrational response of multiple explosive charges fired with various time delays. The invention also provides means for optimizing the delay periods between the firing of individual charges or groups of charges to produce vibrational waves being desired frequencies while minimizing other, undesired frequencies.

In addition to the above, the method of the present invention also provides means for calculating the delay periods between the firing of individual or groups of charges in a multiple charge blasting operation to optimize the overburden material removed while minimizing the damage to surrounding structures. In particular, the method determines delay periods which reduce the low frequency vibrations which produce damage to surrounding structures while maximizing higher frequency vibrations to produce maximum overburden removal through increased fragmentation, swell, or cast.

In a preferred embodiment, therefore, the present invention provides a site-specific method for measuring, analyzing, predicting, controlling, and minimizing ground vibration and airborne noise induced by explosive blasting operations in earth formations. This is accomplished by first generating one or more impulse excitations at corresponding excitation locations in the earth formations of interest. The impulse excitations in turn produce or generate excitation signals. Preferably, this is accomplished by detonating a plurality of single-charge blasting agents, explosives, etc. (the term "explosive" being used in a broad sense throughout this disclosure to mean any agent used to generate an appropriate blast), the explosive having different charge weights, to determine frequency dependent charge weight scaling. Also, at least one plural-charge blast can be detonated having different charge weights and at least one delayed charge. Further, the excitation signal can be shaped by using charges in the plural-charge blast which have different charge weights per delay. Then the resultant vibration and noise responses are measured simultaneously at a plurality of locations different from the excitation locations, to generate corresponding time domain response signals, and to derive frequency dependent distance and angle scaling. Next, from the measured vibration and noise, the time domain response signals are transformed into the frequency domain to generate complex frequency domain transfer functions between specific excitation and response locations of interest, thereby effectively calibrating the earth formation in the vicinity of the blast site.

Next, the complex frequency domain transfer functions are combined with synthesized multiple-charge complex frequency domain optimum excitation signals to obtain a plurality of minimum multiple-charge complex frequency domain response predictions. This is accomplished by first identifying both linear and nonlinear optimum frequencies for minimizing the vibrations, by selecting frequencies of substantial anti-resonances of the primary and included subharmonic and harmonic frequency components. Secondly, a corresponding plurality of synthesized multiple-charge complex frequency domain optimum excitation signals is used to offer a plurality of best fit prediction choices according to the parameters being selected for optimization. Then a corresponding plurality of best choice signals is synthesized based upon these identified optimum frequencies, including compensating for nonlinear response effects by including weighted and phased subharmonic and harmonic components of the primary frequency in the synthesized excitation.

The preferred embodiment of the invention continues with a specification of the optimum blast excitation frequency and delay periods using one of the multiple-charge complex frequency domain response predictions and converting it to a time domain function to minimize the vibration and airborne noise induced by the explosive blasting operation. The frequency domain representation shows the severity of the vibration amplitude as well as its frequency distribution, while the time domain response prediction indicates amplitude severity and duration.

In the preferred embodiment, the accuracy and effectiveness are further improved several ways. One is by using single-time delay blasting caps (i.e., all caps having the same delay). Another is by verifying the response prediction by subsequently firing a multiple-charge, delayed-charge test shot, and then modifying the excitation signals to agree with the test shot. This results in minimizing of the ground vibration and airborne noise, and a more effective use of the explosive energy within the blast zone, thereby improving overburden fragmentation, swell, and cast accordingly.

It is therefore an object of the present invention to provide an improved method for controlling vibrations induced by explosive blasting operations in earth formations; such a method in which the relationship between the blast excitation frequency and delay periods with respect to the resulting vibrations can be analyzed and then used to provide corresponding quantitative predictions of the effects thereof; in which an initial excitation signal is generated by detonating at least one explosive charge at a particular location in the earth formations of interest; in which the resultant vibration responses from the initial charge are measured at another location to generate corresponding time domain response signals; in which, from the measured vibration, complex frequency domain transfer functions may be generated between specific excitation and response locations of interest, thereby effectively calibrating the earth formations in the vicinity of the blast site; in which the complex frequency domain transfer functions are then combined with synthesized multiple-charge complex frequency domain optimum excitation signals to obtain a multiple-charge complex frequency domain response prediction; in which this complex frequency domain response prediction is then used to specify the optimum blast excitation frequency and delay periods for controlling the vibration induced by the explosive blasting operation; and to accomplish the above objects and purposes in an inexpensive, uncomplicated, versatile, and reliable method, inexpensive to implement, and readily suited to the widest possible utilization in controlling vibrational responses induced by explosive blasting operations in earth formations.

These and other objects and advantages of the invention will be apparent from the following description, the accompanying drawings, and the appended claims.

BRIEF DESCRIPTION OF THE DRAWINGS

The present invention will be more easily understood from the following detailed description of a preferred embodiment when taken in conjunction with the attached drawings in which:

FIG. 1 represents a conventional blasting operation for removing overburden from a buried coal seam or similar mineral deposit;

FIG. 3 is a flow chart for a computer program for controlling detonation of electrical blasting cap circuits in accordance with the present invention.

DESCRIPTION OF PREFERRED EMBODIMENT

Figure 2:
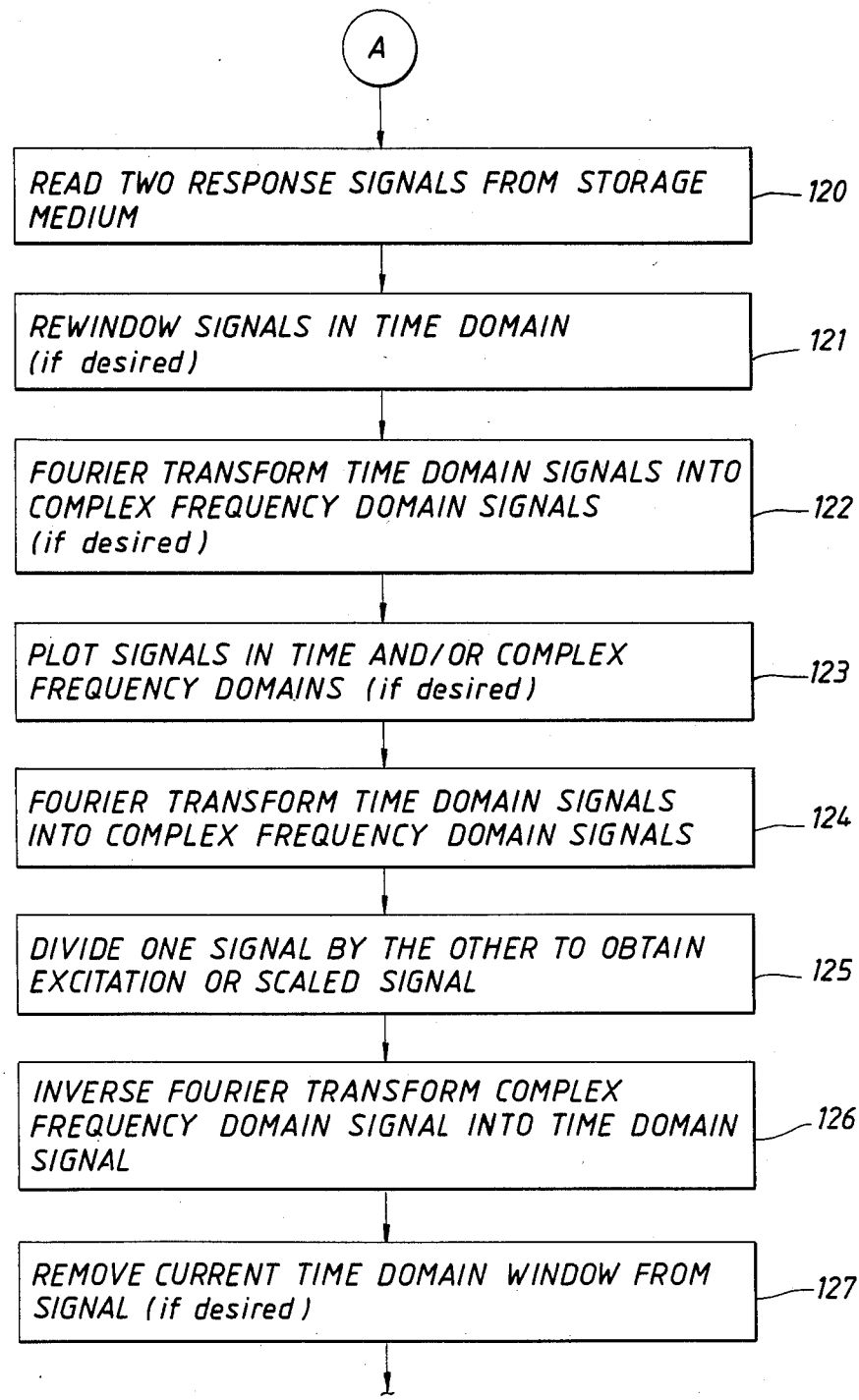
FIG. 2 is a flow chart for a computer program which can be used according to the present invention for blast vibration analysis, prediction, and minimization.
Figure 2:
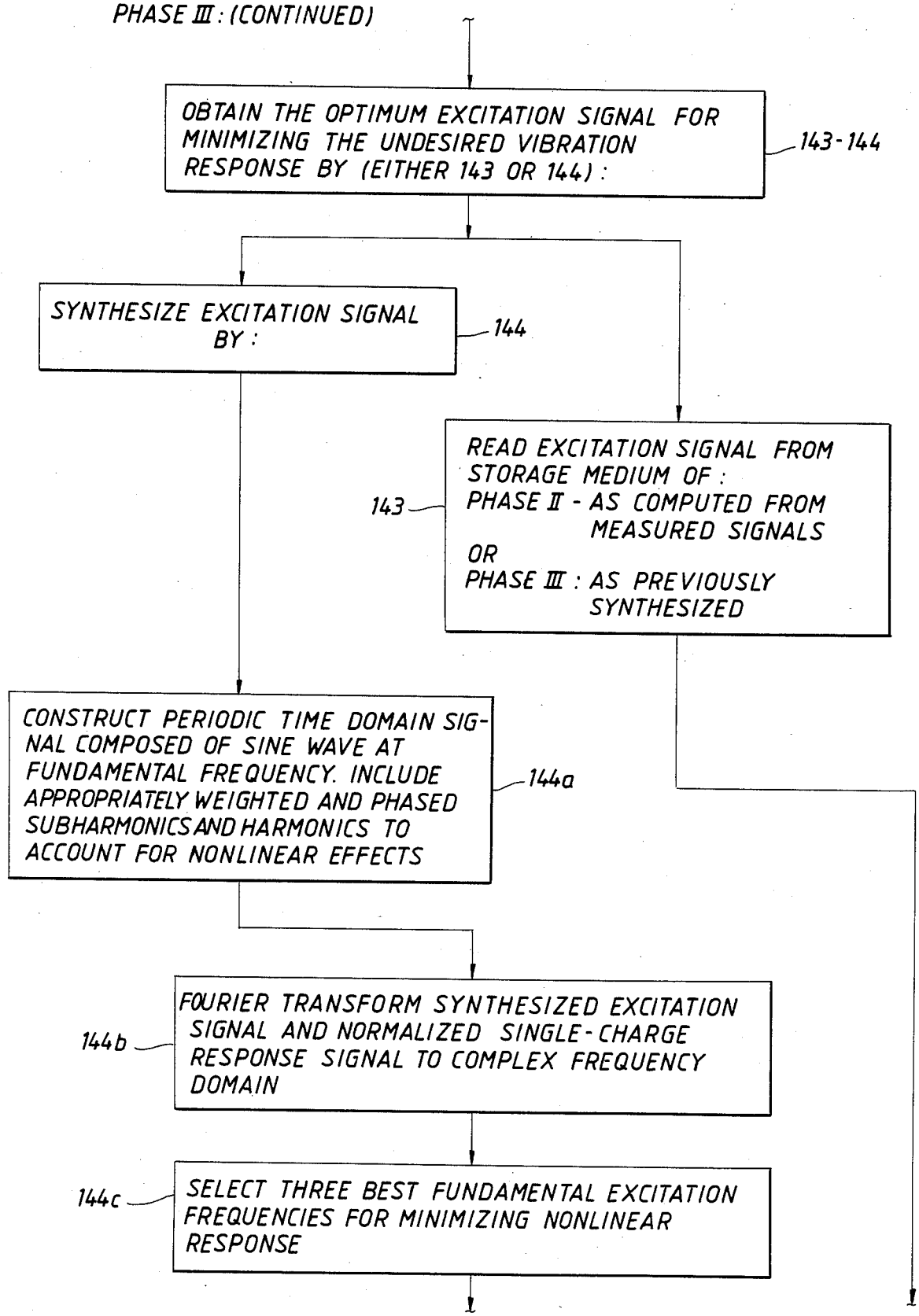
Figure 2:
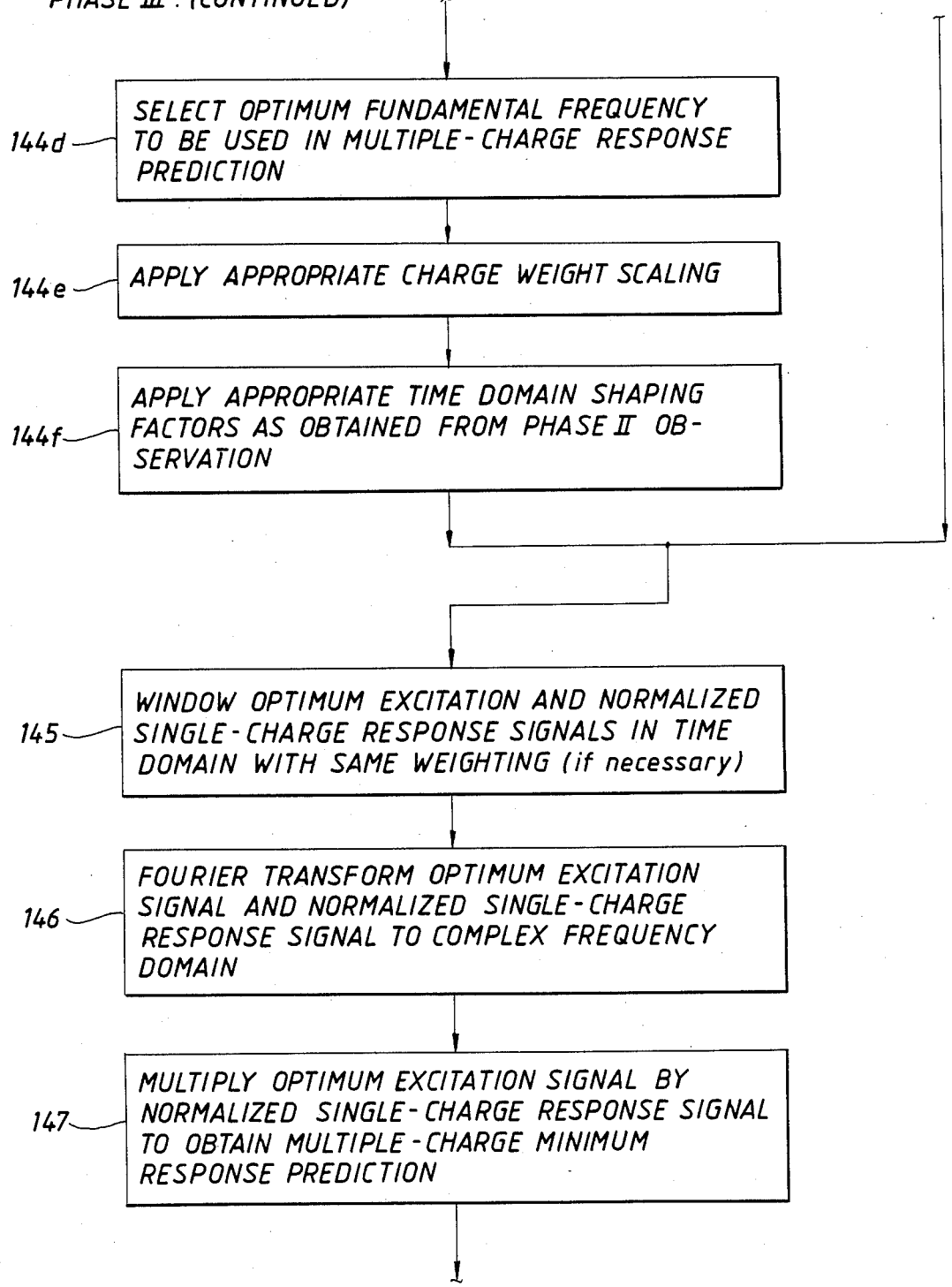

As described above, the U.S. Bureau of Mines (Siskind, et al) has studied the problem of damage to surrounding structures from blasting operations, and the Office of Surface Mining (OSM, 1983) has published regulations for such operations based upon this study. Three methods are allowed for determining compliance. In particular, in surface mining operations one method limits the maximum peak particle velocity (PPV) at the nearest structure to the following:

$$PPV \leq \begin{array}{ll} 1.25 \text{ in/sec,} & D \leq 300 \text{ ft} \\ 1.00 \text{ in/sec, } 300 \text{ ft} \leq D \leq 5000 \text{ ft} \\ 0.75 \text{ in/sec,} & D > 5000 \text{ ft} \end{array} \qquad (1)$$

where D is the distance to the structure. While it is necessary to make measurements to verify the above PPV, it is not necessary to account for the frequency involved in the vibrations.

The second method allows for determining the maximum charge weight W that can be fired utilizing an 8 millisecond delay period between the firing of individual charges. The expression is:

$$W = (D/Ds)^2 \qquad (2)$$

where D equals the distance in feet to the nearest structure and the term Ds equals 50, 55, 65 (ft/lb$^{\frac{1}{2}}$) for the distance ranges given in equation (1) above. Using these formulae it is assured that the PPV of equation (1) are not exceeded, and considerable conservatism is built into the equation to assure this.

In addition to the above, the third method allows for measuring PPV which is frequency related as shown below.

$$PPV(f) \leq \begin{pmatrix} .1875\ f\ \text{in/sec} & 1\ \text{Hz} \leq f \leq 4\ \text{Hz} \\ .75\ \text{in/sec} & 4\ \text{Hz} \leq f \leq 11.25\ \text{Hz} \\ .0667\ f\ \text{in/sec} & 11.25\ \text{Hz} \leq f < 30\ \text{Hz} \\ 2.00\ \text{in/sec} & f \geq 30\ \text{Hz} \end{pmatrix} \quad (3)$$

Equations (3) were developed from curves published by OSM and converted to mathematical expressions. If a company can show by measurement analysis that is can accurately measure or predict the PPV while using larger charge weights and not exceed the above levels, then it is free to use the larger charge weights.

The present invention predicts the amplitude, frequency, and duration of vibrations from multiple charge blasting operations. In particular, the present invention utilizes a single charge (impulse excitation) to produce vibrations in the earth at a selected site. At selected points surrounding the single charge the ground vibration is measured and the single charge wavelet computed. Utilizing the single charge wavelet derived from the single charge measurements, the present invention then provides for predicting the vibration response of a multiple charge blasting operation having various time delays between the detonation of the individual charges. This prediction is accomplished in the frequency domain and includes the effects of large displacement, non-linear response.

The invention utilizes convolution theory where the vibration response in the time domain is expressed by:

$$V_i(t) = i_i(t) * h_{ii}(t) \quad (4)$$

$$V_j(t) = i_i(t) * h_{ij}(t)$$

In the above equations the V is the vibration response, i is the excitation impulse, h is a transfer function, t is time, subscripts i and j represent specific measurement locations, and the * denotes convolution. These equations can be Fourier transformed to the frequency domain to produce the following equations:

$$\overline{V_i(f)} = \overline{I_i(f)} \cdot \overline{H_{ii}(f)} \quad (5)$$

$$\overline{V_j(f)} = \overline{I_i(f)} \cdot \overline{H_{ij}(f)}$$

where f is frequency, the — denotes a complex quantity and the . signifies multiplication. The above complex quantities can be converted to their magnitude and phase components and divided to obtain the following equation in terms of their magnitudes:

$$T_{ij}(f) = \frac{V_j(f)}{V_i(f)} = \frac{H_{ij}(f)}{H_{ii}(f)} \quad (6)$$

where $T_{ij}$ is the acoustical transmission factor, i.e. the fraction of vibration at location i that is transmitted to location j.

Frequency analysis may be performed on the measured response data obtained at each location for either a single or multiple charge blast to provide $V_i$, $V_j$ and $T_{ij}$ which will give an indication of the transmission loss with increasing distance from a blast for a particular site.

One may also use a frequency analysis approach on the measured data at each location to deconvolve the multiple charge excitation effects from the ground system transfer function. In equation (5) the H terms for single and multiple charges are equal (since they depend only on the system parameters and not the excitation details for similar range charge weights) and one obtains:

$$V_{iMC}(f)/V_{iSC}(f) = I_{iMC}(f)/I_{iSC}(f) \quad (7)$$

Therefore, if one assumes that the single charge excitation approximates a Dirac delta impulse function of charge weight amplitude A, equation (7) gives the frequency representation of the multiple charge excitation train, $I_{iMC}(f)$ scaled appropriately by the amplitude of the excitation which is constant over the frequency range of interest. The inverse Fourier transform of equation (7) back to the time domain will provide the normalized multiple charge excitation train, $i_{iMC}(t)$.

From the above it is seen that it is possible to predict the amplitude, frequency, and duration of ground motion at a specific location for any number and distribution of blast charges and times provided the response at this location is known for a single charge blast. In particular, the measurements are made at a particular mine site by detonating a single charge blast and measuring the earth response at a plurality of locations. From these measurements it is possible to convolve them with multiple charge excitations to predict the ground responses at these locations to the multiple charge excitation.

Referring to FIG. 1, there is shown a typical surface mine site in which it is necessary to remove the overburden 10 to expose a mineral seam 12. In particular, the overburden may typically comprise shale, sandstone, or limestone and the mineral seam 12 may be, typically, a coal seam. The overburden may be fragmented and loosened by the blast and then removed with machinery. In some instances, however, it is preferable that the overburden be removed by casting it off the coal seam in the directions of the arrows 11, so that only a minimum amount of material must be physically removed to expose the coal seam. This, of course, reduces the overall cost of the mining operation. Normally, a series of blast holes is drilled and loaded with suitable explosives, and these are then detonated in a prearranged sequence. For example, five rows of blast holes shown at 13 and denoted 1, 2, 3, 4, 5 may be drilled. The holes are usually drilled on a uniform pattern, either one behind the other in a rectangular pattern or staggered in alternating rows, so that the echelons 14 are aligned. In normal practice, from 1 to 400 holes (or more) are drilled and loaded in a single blasting operation. The holes may be loaded with one or more charges. In FIG. 1 two separate charges of explosives 15 are shown with, typically, 25 to 4000 lbs of explosives included in each of the separate charges.

In conventional practice, the charges are not usually detonated simultaneously. Instead, certain predetermined delays are introduced to help achieve the desired result. These delays are often achieved with a combination of electrically triggered blasting caps having many different predetermined internal delays and a blasting machine capable of providing delays between different blasting cap circuits. The charges are then set off one at a time, with appropriately controlled delays between each charge.

One important improvement of the present invention is the provision for using electric blasting caps having a single delay only, if desired. That is, each charge is loaded with a blasting cap having the same delay period. These identical delays are long enough (for example, greater than 100 ms) so that a sufficient number of caps is excited before the first one detonates. This prevents detonation circuit cutoffs which might be caused by ground movement (e.g., breaking the wires leading to the detonators). Delays between charges or groups of charges fired together, are then provided in the present invention either by a microcomputer and appropriate software, or a sequential blasting machine capable of providing many circuits with variable delays (for example, in millisecond increments) between circuits. Note that by using frequencies (the inverse of delay periods) which produce minimum vibration, much more charge weight per delay can be used than previously thought possible. Hence, with the present invention it is now easily possible to set off multiple charges on a row, echelon, etc., at the same time and still not exceed the vibration regulations described earlier. Thus, the use of different charge weights per delay can be by providing various charge weights, various charge weights per hole, or additional charges, echelons, etc., per delay and so forth.

Recalling, then, that in the blasting operation, in addition to removing the overburden 10 it is also necessary to prevent damage to surrounding buildings such as illustrated at 20, the present invention readily addresses and meets that requirement too. As explained above, the method of the present invention comprises, first, detonating a single test blast at the selected mine site and making measurements of the earth vibrations at at least one location on or in the immediate site vicinity. Preferably, the single test blast may comprise one or more holes which are loaded with one or more charges of explosives. Measurements are then made at various distances from the blast site to obtain sufficient data to carry out the method of the present invention. Once the ground response is obtained, the present invention then predicts the response for multiple blasts, as shown in FIG. 1.

In addition to predicting the ground response to multiple blasts, the method of this invention also provides a means for optimizing the overburden removal while minimizing the damage to surrounding structures such as building 20. In particular, it has been discovered that if the delay periods are controlled, preferably in the range of 15 to 40 milliseconds (frequencies of 25–67 Hz) between individual delays for overburdens in surface coal mines, the resulting blasts contain substantially greater high frequency excitations, and the low frequency excitations are considerably reduced. Of course, the low frequency excitations are the excitations that produce the ground vibrations that result in damage to surrounding structures. This holds true for any blasting operation, i.e., other than coal, although the frequency range (delay times) may be changed, as long as it is ensured that the primary excitation frequency is sufficiently higher than the ground resonance frequency (primary delay period is sufficiently shorter than the ground resonance period) and coincides closely with ground frequency minima (antiresonances).

Referring now to FIGS. 2 and 3, the preferred analytical and control procedures will be explained in greater detail.

FLOW DIAGRAM EXPLANATION (FIG. 2)

BLAST VIBRATION ANALYSIS, PREDICTION, AND MINIMIZATION

Phase I: PRE-PROCESSING OF MEASURED RESPONSE SIGNALS

Step Number

100—SPECIFY DATA DIGITIZATION PARAMETERS: The data digitization parameters include the sampling rate, channel numbers, and duration of digitization. These parameters are entered into the computer by the operator, and the computer then sends the information to the data digitization unit (multiprogrammer). The sampling rate tells the computer how fast (in samples per second) each signal or channel of data should be digitized. The channel numbers parameter tells the computer which channels of the 16 available are to be scanned. The duration parameter indicates how long the data acquisition process should continue (e.g. 10 seconds).

101—DIGITIZE MEASURED GROUND VIBRATION AND AIRBORNE NOISE RESPONSE SIGNALS: After the data digitization process is started, it continues until the duration (set in step 100) expires. The data is then transferred from the multiprogrammer to the computer.

102—REMOVE DC COMPONENTS FROM SIGNALS: The DC shift or constant off-set of each channel is set to zero. The DC shift is introduced by the electronic equipment used to measure the signals and is not part of the ground vibration signal.

103—IDENTIFY SIGNAL TYPE, LOCATION, DIRECTION, RUN NUMBER, AND CALIBRATION FACTOR: All the signals digitized in step 101 are arranged according to measurement location and assigned a signal type (i.e. velocity or acceleration), a direction (X, Y, Z, or M), a run number, and a calibration factor. NOTE: X, Y, and Z are orthogonal directions for ground vibration and M specifies a microphone channel.

104—POSITION START OF TRANSIENT SIGNALS IN TIME DOMAIN: Usually the operator initiates step 101 a few seconds prior to the actual ground vibration signal. This step removes the few seconds of electronic data which is digitized before the actual vibration signal of interest.

105—REMOVE POST-SIGNAL NOISE IN TIME DOMAIN: Now that the beginning of the signal is positioned correctly in time, the electronic noise, present on the channel after the actual vibration data of interest dies out, is set to zero.

106—CALIBRATE SIGNALS: The individual calibration factors entered in step 103 are applied to their respective signals.

107—INTEGRATE SIGNALS (if desired): Every measured acceleration signal is normally integrated to velocity because velocity is the accepted industry measurement quantity for ground vibration. The integration is performed in the frequency domain. Normally, directly measured velocity and sound signals are not integrated.

108—WINDOW SIGNALS IN TIME DOMAIN (if desired): Mathematically correct exponential time window functions may be applied to the digitized data at this time, in known fashion, to reduce high frequency noise introduced by the digitization process (aliasing). Three parameters are required for such an exponential window. These are the exponential decay (alpha) factor, the window's beginning point, and the window's ending point. These factors are entered by the user.

109—FOURIER TRANSFORM TIME DOMAIN SIGNALS INTO COMPLEX FREQUENCY DOMAIN SIGNALS (if desired): A Fast Fourier Transform (FFT) is performed on all time domain signals to produce the complex frequency domain representation of each signal (magnitude and phase). (The FFT algorithm is well known and accepted by professionals in both the engineering and computer science fields.)

110—PLOT RESPONSE SIGNALS IN TIME AND/OR COMPLEX FREQUENCY DOMAINS (if desired): The signals can be plotted in the time and/or frequency domain.

111—SAVE RESPONSE SIGNALS ON STORAGE MEDIUM: The digitized signals can now be saved for later use in the program.

PHASE II: NORMALIZATION OF ONE MEASURED RESPONSE SIGNAL BY ANOTHER:
  a: EXTRACTION OF TRUE EXCITATION SIGNAL FOR COMPARISON WITH SYNTHESIZED EXCITATION SIGNAL
  b: SCALING OF CHARGE WEIGHT, DISTANCE, DIRECTION, ETC.

120—READ TWO RESPONSE SIGNALS FROM STORAGE MEDIUM: Two previously digitized and saved signals are read from the storage medium. The computer then checks both signals' data digitization parameters to insure that the signals are compatible.

121—REWINDOW SIGNALS IN TIME DOMAIN (if desired): The window applied to the signal in step 108 can now be changed, if desired.

122—FOURIER TRANSFORM TIME DOMAIN SIGNALS INTO COMPLEX FREQUENCY DOMAIN SIGNALS (if desired): The time domain signals are transformed into complex frequency domain signals.

123—PLOT SIGNALS IN TIME AND/OR COMPLEX FREQUENCY DOMAIN (if desired): Both signals can be plotted as signal amplitude versus time and/or signal spectrum magnitude and phase versus frequency.

124—FOURIER TRANSFORM TIME DOMAIN SIGNALS INTO COMPLEX FREQUENCY DOMAIN SIGNALS: Both time domain signals are transformed into complex frequency domain signals.

125—DIVIDE ONE SIGNAL BY THE OTHER TO OBTAIN EXCITATION OR SCALED SIGNAL: This division in the frequency domain removes (deconvolves) the effects of one signal from the other. The quotient is the multiple-charge excitation signal if the dividend is the multiple-charge (MC) response and the divisor is the single-charge (SC) response. If both signals are from similar blasts, e.g., SC blasts, then the quotient represents a scaled signal of interest.

126—INVERSE FOURIER TRANSFORM COMPLEX FREQUENCY DOMAIN SIGNAL INTO TIME DOMAIN SIGNAL: This step is the reverse process of step 122. However, in the preferred embodiment only the quotient signal is inverse transformed into the time domain. The dividend and divisor time domain signals are available from the storage medium, if needed.

127—REMOVE CURRENT TIME DOMAIN WINDOW FROM SIGNAL (if desired): The quotient signal is now in the time domain. It contains the window characteristics applied to the dividend and divisor signals in steps 108 and 121. The window can be removed from the quotient signal at this point, if desired.

128—REMOVE POST-DATA NOISE FROM THE SIGNAL (if necessary): Typically, the latter portion of the quotient signal is electronic noise. This portion of the signal can be removed, if desired.

129—PLOT SIGNAL IN THE TIME AND/OR COMPLEX FREQUENCY DOMAINS (if desired): The quotient signal can now be plotted in the time and/or complex frequency domains.

130—SAVE SIGNAL ON STORAGE MEDIUM (if desired): The quotient signal can now be saved and used later, if desired.

PHASE III: SYNTHESIS OF EXCITATION SIGNALS AND PREDICTION OF RESPONSE SIGNALS FOR MINIMIZING VIBRATION AND NOISE

140—READ ONE SINGLE-CHARGE RESPONSE SIGNAL FROM STORAGE MEDIUM: This signal is generally created in Phase I, although the computer will in fact accept any signal generated by the system.

141—NORMALIZE SINGLE-CHARGE RESPONSE SIGNAL BY APPROPRIATE CHARGE WEIGHT SCALING FACTORS DETERMINED FROM PHASE II: The signal read in step 140 is normalized to account for charge weight scaling. The charge weight scaling factor as a function of frequency is determined in Phase II as the quotient from the division of two single-charge signals of differing charge weights.

142—SELECT BEST EXCITATION FREQUENCY CANDIDATES FOR MINIMIZING PREDICTED LINEAR MULTIPLE-CHARGE RESPONSE FROM MINIMA (ANTIRESONANCES) OF SINGLE-CHARGE RESPONSE CURVE ABOVE PREDOMINANT RESPONSE FREQUENCY RANGE: Determine the best delay time to use for a linear multiple-charge blast by examining the frequency domain plots of the normalized single-charge response signal, and selecting the frequency of minimum response (the minimum antiresonance). The optimum linear delay time is the inverse of this frequency.

143-144—OBTAIN THE OPTIMUM EXCITATION SIGNAL FOR MINIMIZING THE UNDESIRED VIBRATION RESPONSE BY EITHER 143 OR 144:

143—READ EXCITATION SIGNAL FROM STORAGE MEDIUM FROM EITHER PHASE II AS COMPUTED FROM MEASURED SIGNALS, OR PHASE III, AS PREVIOUSLY SYNTHESIZED: The excitation signal used to predict the multiple-charge ground vibration can be the excitation signal saved in step 130. One would choose this signal if he wanted to confirm the results obtained in Phase II of the program or if he wanted to use a single-charge signal from another location to predict multiple-charge response at the new location due to the same excitation.

144—SYNTHESIZE EXCITATION SIGNAL BY:

144a—CONSTRUCT PERIODIC TIME DOMAIN SIGNAL COMPOSED OF SINE WAVE AT FUNDAMENTAL FREQUENCY. INCLUDE APPROPRIATELY WEIGHTED AND PHASED SUBHARMONICS AND HARMONICS TO ACCOUNT FOR NONLINEAR EFFECTS: A periodic time signal is constructed for a fundamental excitation frequency. Periodic time signals at subharmonic and harmonic frequencies of the fundamental are then constructed and weighted appropriately, according to the specific situation being analyzed. These are added to the fundamental, accounting for the appropriate phase of each relative to the fundamental, according to the specific situation being analyzed.

144b—FOURIER TRANSFORM SYNTHESIZED EXCITATION SIGNAL AND NORMALIZED SINGLE-CHARGE RESPONSE SIGNAL TO COMPLEX FREQUENCY DOMAIN: Both time domain signals are transformed into complex frequency domain signals.

144c—SELECT THREE BEST FUNDAMENTAL EXCITATION FREQUENCIES FOR MINIMIZING NON-LINEAR RESPONSE: Scan the normalized single-charge response signal with the excitation signal generated in 144a over the fundamental frequency range of interest. Select the three best fundamental frequencies for minimizing nonlinear response.

144d—SELECT OPTIMUM FUNDAMENTAL FREQUENCY TO BE USED IN MULTIPLE-CHARGE RESPONSE PREDICTION: The optimum from the linear or nonlinear best excitation frequencies of 142 or 144c, as appropriate, or any other frequency of interest may be selected for use with the synthesized multiple-charge excitation signal.

144e—APPLY APPROPRIATE CHARGE WEIGHT SCALING: The frequency dependent charge-weight scaling developed in step 125 is applied to the synthesized excitation signal at this time.

144f—APPLY APPROPRIATE TIME DOMAIN SHAPING FACTORS AS OBTAINED FROM PHASE II OBSERVATIONS: When charge-weight per delay is varied through the blast pattern, the amplitude of the synthesized excitation signal must be shaped in time to account for this variation. The shaping can be improved by utilizing prior operating experience gained from analyzing actual signals (as explained in step 125).

145—WINDOW OPTIMUM EXCITATION AND NORMALIZED SINGLE-CHARGE RESPONSE SIGNALS IN TIME DOMAIN WITH SAME WEIGHTING (if necessary): The window applied here is similar to the window applied in steps 108 and 121.

146—FOURIER TRANSFORM OPTIMUM EXCITATION SIGNAL AND NORMALIZED SINGLE-CHARGE RESPONSE SIGNAL TO COMPLEX FREQUENCY DOMAIN: This process uses the same FFT program subroutine as used in step 109.

147—MULTIPLY OPTIMUM EXCITATION SIGNAL BY NORMALIZED SINGLE-CHARGE RESPONSE SIGNAL TO OBTAIN MULTIPLE-CHARGE MINIMUM RESPONSE PREDICTION: These two complex signals are multiplied (convolved) in the frequency domain to produce the multiple-charge minimum response prediction.

148—INVERSE FOURIER TRANSFORM PREDICTED COMPLEX FREQUENCY DOMAIN RESPONSE SIGNAL INTO TIME DOMAIN SIGNAL: This step transforms the result of step 147 into the time domain using the inverse FFT transform.

149—REMOVE WINDOW FROM PREDICTED MULTIPLE-CHARGE MINIMUM RESPONSE SIGNAL (if necessary): The window applied to the signals in step 145 can now be removed, if necessary.

150—PLOT NORMALIZED SINGLE-CHARGE RESPONSE SIGNAL, OPTIMUM EXCITATION SIGNAL, AND PREDICTED MULTIPLE-CHARGE MINIMUM RESPONSE SIGNAL IN TIME AND/OR COMPLEX FREQUENCY DOMAIN (if desired): The operator now has the option of plotting the predicted signal in both the time and frequency domains.

151—SAVE SYNTHESIZED EXCITATION AND PREDICTED RESPONSE SIGNALS ON STORAGE MEDIUM FOR LATER COMPARISONS WITH, AND MODIFICATIONS BASED ON, FIELD MEASURED MULTIPLE-CHARGE EXCITATIONS AND RESPONSES: The predicted signal can be saved for future analysis.

FLOW DIAGRAM EXPLANATION (FIG. 3)
COMPUTER CONTROLLED DETONATION OF ELECTRIC BLASTING CAP CIRCUITS

200—SPECIFY GEOMETRY, TIMING, AND SEQUENCING OF BIASING PATTERN PARAMETERS: A blasting pattern is input into the computer system via a graphical display. Boreholes are entered by row and column. Each borehole may contain multiple (decked) charges. Charges to be detonated at the same time are entered on the same blasting circuit. The last parameter entered is the constant delay time between circuits.

201—MANUALLY CONNECT BLASTING CAP CIRCUITS TO CIRCUIT TERMINAL BOX: The field blasting circuits are connected to the computer system. This is a manual step and is performed AFTER the equipment is on and self-tested to assure safe operation of the system.

202—CHECK BLASTING CIRCUITS FOR OPEN, SHORTED, OR OVERLOADED CONDITIONS. WARN BLASTER AND TERMINATE BLAST PROCEDURE WHEN ANY OF THESE CONDITIONS ARE DETECTED. PRINT OUT TABLE OF CIRCUIT CONDITIONS: Each blasting circuit is checked for open circuit, short circuit, and overload circuit conditions. An open circuit results from an unconnected wire. A short circuit results from crossed wires. An overload circuit results from too many blasting caps connected to a single circuit. If any of these conditions is found, the computer will now allow detonation of any circuit until the condition is corrected.

203—IF CIRCUITS PASS TEST, ENTER PASSWORD TO INITIATE BLAST DETONATION COUNTDOWN. FOR SAFETY PURPOSES, BLAST PROCEDURE MAY BE ABORTED AT ANY TIME DURING COUNTDOWN PRIOR TO DETONATION: If all the blasting circuits used in the pattern pass the circuit check, the blast is ready for detonation. For safety purposes, the user must enter a password into the computer before the computer will begin the detonation sequence. The required password prevents the untimely detonation of a field blast. After the password is entered, the computer starts a countdown sequence. During the countdown the blast detonation can be aborted by pressing any key on the computer keyboard.

204—IF NOT ABORTED, BLAST IS DETONATED AT END OF COUNTDOWN: If the countdown is not aborted, the blast is detonated at the end of the countdown sequence. The countdown lasts approximately 10 seconds.

As may be seen, therefore, the present invention provides numerous advantages. Specifically, it provides a site-specific method for measurement, analysis, prediction, minimization and control of ground vibrations and airborne noise induced by overburden blasting operations such as in surface mines. Field tests have verified this method for obtaining signatures of the overburden vibration and air noise characteristics at locations of interest near the mine, selecting the optimum excitation frequency for minimizing vibrations, measuring and synthesizing multiple-charge excitation signals for minimizing vibration amplitude and duration and controlling frequency, accurately predicting the multiple-charge vibration response in both the time and frequency domains, and accurately controlling the blast detonation to achieve the predicted vibration control. By minimizing the vibrational energy radiated from the blast zone (i.e. confining the energy to the blast zone), and by optimizing the number and size of charges detonated per delay period as allowed by this technique, more effictive use of the explosive energy is obtained within the blast zone itself for improving overburden fragmentation, swell, and cast. In all of the phases of this technique, including actual blast detonationn, personal computer hardware and software can be used in either field or office environments. In contrast to earlier time domain superposition approaches, which effectively limit predictions to cases of linear vibration encountered when using small charge weights to produce small deflections, the present invention teaches using convolution in the frequency domain, providing for consideration of the nonlinear vibrations which are frequently encountered in the large charge weight, large deflection cases of coal overburden blasting operations. The present invention also furnishes a more direct understanding of the characteristics and effects of the multiple-charge excitation signal at the response location of interest.

It is also to be understood, as explained earlier, that when the charge weight per delay of the multiple-charge blast does not vary significantly from the charge weight of the single-charge blast and when the measurement location is sufficiently far removed from the excitation location so as to produce only small, linear vibrations, then the optimum excitation frequency (delay period) for the linear multiple-charge blast can be obtained from the single-charge complex frequency domain response signature directly, i.e., it is the frequency corresponding to the minimun (antiresonance) response.

What is claimed is:

1. A method for controlling vibration induced by explosive blasting operations in earth formation, comprising:

detonating at least one predetermined explosive charge at at least a first predetermined location in the earth formations of interest, to generate a corresponding excitation signal;

measuring the resultant vibration responses at at least one predetermined location different from the first location to generate corresponding time domain response signals;

from the measured vibration, generating complex frequency domain transfer functions between specific excitation and response locations of interest, thereby effectively calibrating the earth formations in the vicinity of the blast site; and combining the complex frequency domain transfer functions with synthesized multiple-charge complex frequency domain optimum excitation signals to obtain a multiple-charge complex frequency domain response prediction.

2. The method of claim 1 wherein said step of generating complex frequency domain transfer functions further comprises transforming the time domain response signals into the frequency domain.

3. The method of claim 1 wherein said step of obtaining a multiple-charge complex frequency domain response prediction further comprises:

identifying optimum excitation frequencies for achieving the desired vibrations; and synthesizing a best choice excitation signal based upon such identified optimum frequencies.

4. The method of claim 3 wherein:

said step of identifying optimum frequencies further comprises identifying both linear and nonlinear optimum frequencies; and said step of synthesizing a best choice signal further comprises compensating for nonlinear response effects by including weighted and phased subharmonic and harmonic components of the primary frequency in the synthesized excitation.

5. The method of claim 4 wherein said step of identifying optimum frequencies further comprises selecting frequencies of substantial antiresonances of the primary and included subharmonic and harmonic frequency components.

6. The method of claim 1 further comprising converting the complex frequency domain response prediction to a time domain function.

7. The method of claim 1 further comprising detonating a plurality of single-charge explosions.

8. the method of claim 7 wherein said step of detonating a plurality of single-charge explosions further comprises determining frequency dependent charge weight scaling by detonating explosions having different charge weights.

9. The method of claim 1 further comprising detonating at least one plural-charge explosion.

10. The method of claim 9 wherein the plural-charge explosion utilizes different charge weights.

11. The method of claim 10 further comprising shaping the excitation signal by using different charge weights per delay.

12. The method of claim 9 wherein the plural-charge explosion includes at least one delayed charge.

13. The method of claim 1 wherein said measuring step further comprises deriving frequency dependent distance and angle scaling by measuring the resultant responses simultaneously at a plurality of predetermined locations.

14. The method of claim 1 further comprising verifying the response prediction by subsequently firing a multiple-charge, delayed-charge test shot.

15. The method of claim 14 further comprising modifying the excitation signals to agree with the test shot.

16. The method of claim 1 further comprising increasing the actual detonation period accuracy by using single-time delay caps.

17. The method of claim 1 wherein said step of obtaining a multiple-charge complex frequency domain response prediction further comprises obtaining a plurality of such predictions using a plurality of synthesized multiple-charge complex frequency domain optimum excitation signals to offer a plurality of best fit prediction choices according to the parameters being selected for optimization.

18. A site-specific method for measuring, analyzing, predicting, controlling, and minimizing ground vibration and airborne noice induced by explosive blasting operations in earth formations, such as surface coal mining, comprising:
at a plurality of predetermined excitation locations in the earth formations of interest, generating impulse excitations to generate excitation signals by detonating a plurality of single-charge explosions having different charge weights to determine frequency depending charge weight scaling, and detonating at least one plural-charge explosion having different charge weights and at least one delayed charge;
shaping the excitation signal by using a plural-charge explosion having different charge weights per delay;
measuring the resultant vibration and noise responses simultaneously at a plurality of predetermined locations different from the excitation locations to generate corresponding time domain response signals, and to derive frequency dependent distance and angle scaling;
from the measured vibration and noise, transforming the time domain response signals into the frequency domain to generate complex frequency domain transfer functions between specific excitation and response locations of interest, thereby effectively obtaining the signatures of the earth formations in the vicinity of the blast site;
combining the complex frequency domain transfer functions with synthesized multiple-charge complex frequency domain optimum excitation signals to obtain a plurality of minimun multiple-charge complex frequency domain response predictions, by
(i) identifying both linear and nonlinear optimum frequencies for minimizing the vibrations, by selecting frequencies of substantial antiresonances of the primary and included subharmonic and harmonic frequency components;
(ii) a corresponding plurality of synthesized multiple-charge complex frequency domain optimum excitation signals to offer a plurality of best fit prediction choices according to the parameters being selected for optimization; and
(iii) synthesizing a corresponding plurality of best choice signals based upon such identified optimum frequencies, including compensating for nonlinear response effects by including weighted and phased subharmonic and harmonic components of the primary frequency in the synthesized excitation;
using one of the complex frequency domain response predictions to specify the optimum blast excitation frequency and delay periods for minimizing the vibration and airborne noise induced by the explosive blasting operations;
increasing the actual detonation period accuracy by using single-time delay caps;
verifying the response prediction by subsequently firing a multiple-charge, delayed-charge test shot; and
modifying the excitation signals to agree with the test shot, thereby minimizing ground vibration and airborne noise, making more effective use of the explosive energy within the blast zone, and accordingly improving overburden fragmentation, swell, and cast.

19. A method for increasing overburden removal efficiency during explosive blasting operations in earth formations, comprising:
detonating at least one predetermined explosive charge at at least a first predetermined location in the earth formations of interest, to generate a corresponding excitation signal;
measuring the resultant vibration responses at at least one predetermined location different from the first location to generate corresponding time domain response signals;
from the measured vibration, generating complex frequency domain transfer functions between specific excitation and response locations of interest, thereby effectively calibrating the earth formations in the vicinity of the blast site; and
combining the complex frequency domain transfer functions with synthesized multiple-charge complex frequency domain optimum excitation signals to obtain a minimum multiple-charge complex frequency domain response prediction for minimizing the vibration induced by the explosive blasting operations to keep the energy of the blast in the blast zone.

20. The method of claim 19 further comprising increasing the overburden removal of efficiency by increasing the charge weight per delay to restore the lowered vibration levels toward permissible regulatory limits, thereby increasing fragmentation, swell, and cast.

21. The method of claim 19 wherein said step of generating complex frequency domain transfer functions further comprises transforming the time domain response signals into the frequency domain.

22. The method of claim 19 wherein said step of obtaining a multiple-charge complex frequency domain response prediction further comprises:
identifying optimum excitation frequencies for achieving the desired vibrations; and
synthesizing a best choice excitation signal based upon such identified optimum frequencies.

23. The method of claim 22 wherein:
said step of identifying optimum frequencies further comprises identifying both linear and nonlinear optimum frequencies, and
said step of synthesizing a best choice signal further comprises compensating for nonlinear response effects by including weighted and phased subharmonic and harmonic components of the primary frequency in the synthesized excitation.

24. The method of claim 23 wherein said step of identifying optimum frequencies further comprises selecting frequencies of substantial antiresonances of the primary and included subharmonic and harmonic frequency components.

25. The method of claim 19 further comprising converting the complex frequency domain response prediction to a time domain function.

* * * * *